(12) United States Patent
Schober et al.

(10) Patent No.: US 8,724,572 B2
(45) Date of Patent: May 13, 2014

(54) CHANNEL STATE INFORMATION FEEDBACK

(75) Inventors: Karol Schober, Helsinki (FI); Tommi Koivisto, Espoo (FI); Timo Roman, Espoo (FI); Mihai Enescu, Espoo (FI); Timo Lunttila, Espoo (FI)

(73) Assignee: Nokia Corporation, Espoo (FI)

( * ) Notice: Subject to any disclaimer, the term of this patent is extended or adjusted under 35 U.S.C. 154(b) by 142 days.

(21) Appl. No.: 13/318,107

(22) PCT Filed: Apr. 22, 2010

(86) PCT No.: PCT/FI2010/050329
§ 371 (c)(1),
(2), (4) Date: Jan. 23, 2012

(87) PCT Pub. No.: WO2010/125237
PCT Pub. Date: Nov. 4, 2010

(65) Prior Publication Data
US 2012/0113851 A1 May 10, 2012

Related U.S. Application Data

(60) Provisional application No. 61/214,855, filed on Apr. 28, 2009.

(51) Int. Cl.
*H04W 4/00* (2009.01)
(52) U.S. Cl.
USPC ............................. 370/329; 370/252; 370/230
(58) Field of Classification Search
USPC ........................... 370/252, 229, 230, 231, 253
See application file for complete search history.

(56) References Cited

U.S. PATENT DOCUMENTS

2008/0304464 A1 12/2008 Borkar et al.
2010/0166097 A1* 7/2010 Zhou et al. .................... 375/267

FOREIGN PATENT DOCUMENTS

WO 2009/026769 A1 3/2009

OTHER PUBLICATIONS

Philips, "CSI feedback improvements for LTE-A based on multiple codebooks", 3GPP TSG RAN WG1 Meeting #56bis, R1-091288, Agenda Item: 15.6, Mar. 23-27, 2009, 8 Pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.6.0, Sep. 2008, pp. 1-137.

(Continued)

*Primary Examiner* — Dady Chery
(74) *Attorney, Agent, or Firm* — Nokia Corporation

(57) ABSTRACT

In an embodiment, state of a wireless channel on which information is received is measured; the measured state is used to select from a codebook a plurality of N codewords which optimize a predefined measure, and first and second codewords of the plurality are reported which best optimizes and next-best optimizes the predefined measure. If by example the above is done by a user equipment UE, in another embodiment the network receives first and second indications, searches a codebook using the first and second indications to find the first and second codewords; and utilizes them to improve the channel state information, such as by interpolating between them to find an estimate of the channel. In examples the channel is a MIMO channel that is estimated at two or more antenna ports, there are interpolation weights sent with the codeword indications, and the interpolating uses a geodesic algorithm.

20 Claims, 8 Drawing Sheets

(56) References Cited

OTHER PUBLICATIONS

"3rd Generation Partnership Project; Technical Specification Group Radio Access Network; Requirements for Further Advancements for E-UTRA (LTE-Advanced) (Release 8)", 3GPP TR 36.913, V8.0.0, Jun. 2008, pp. 1-14.

"3rd Generation Partnership Project; Technical Specification Group Radio Access Network; Further Advancements for E-UTRA Physical Layer Aspects (Release 9)", 3GPP TR 36.814, V0.4.1, Feb. 2009, pp. 1-31.

International Search Report and Written Opinion received for corresponding Patent Cooperation Treaty Application No. PCT/FI2010/050329, dated Aug. 5, 2010, 11 pages.

Ericsson et al., "CQI and PMI feedback on PUSCH for multi-codewords and precoding", TSG RAN WG1 meeting #51 bis, R1-080527, Agenda Item: 6.3.5, Jan. 14-18, 2008, 3 pages.

LG Electronics, "Issues on Higher Order MIMO", 3GPP TSG RAN WG1 Meeting #55bis, R1-090219, Agenda item: 12.5, Jan. 12-17, 2009, 4 Pages.

\* cited by examiner

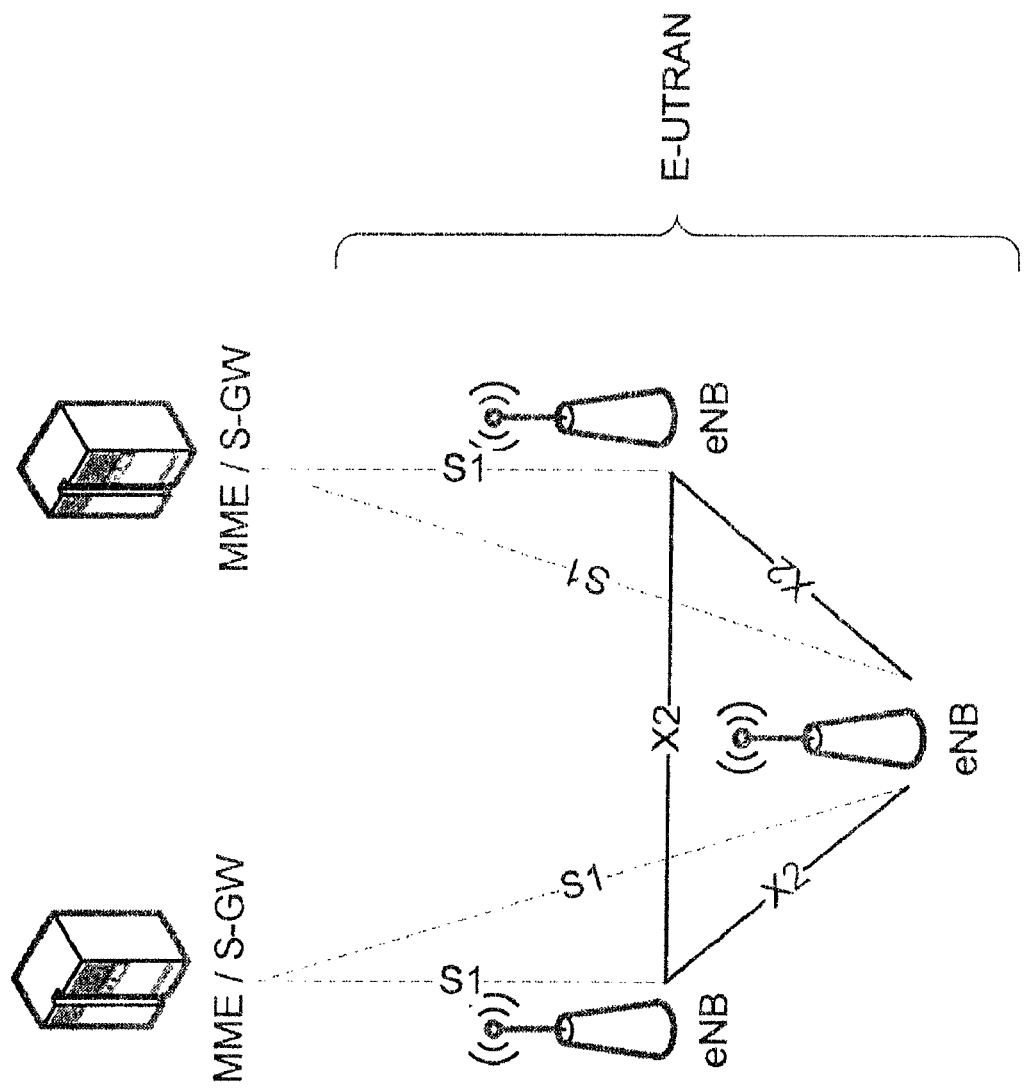
Fig. 1: Prior Art

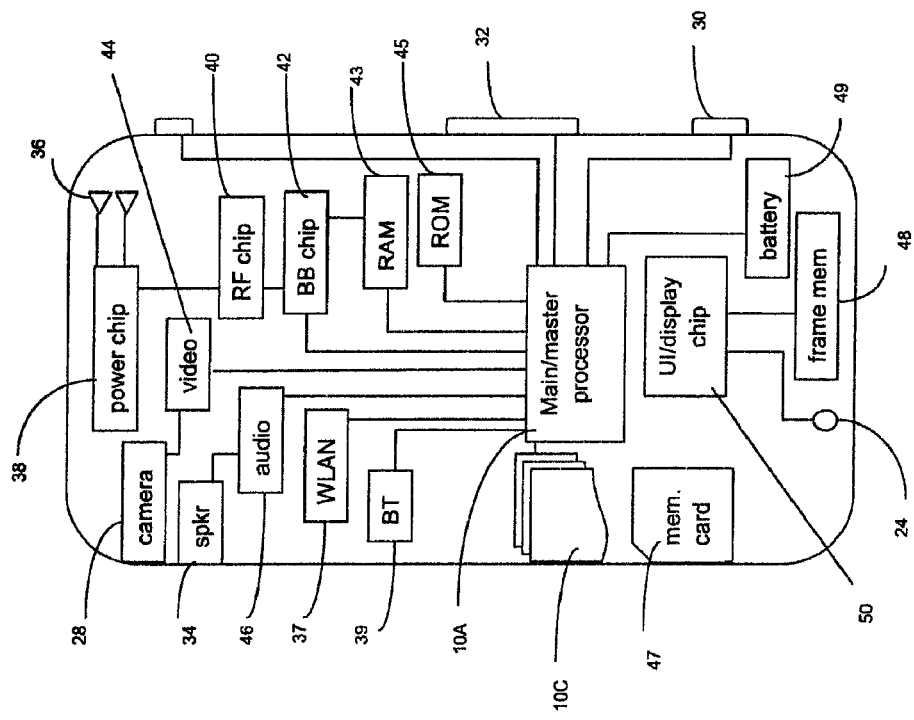
Fig. 2B
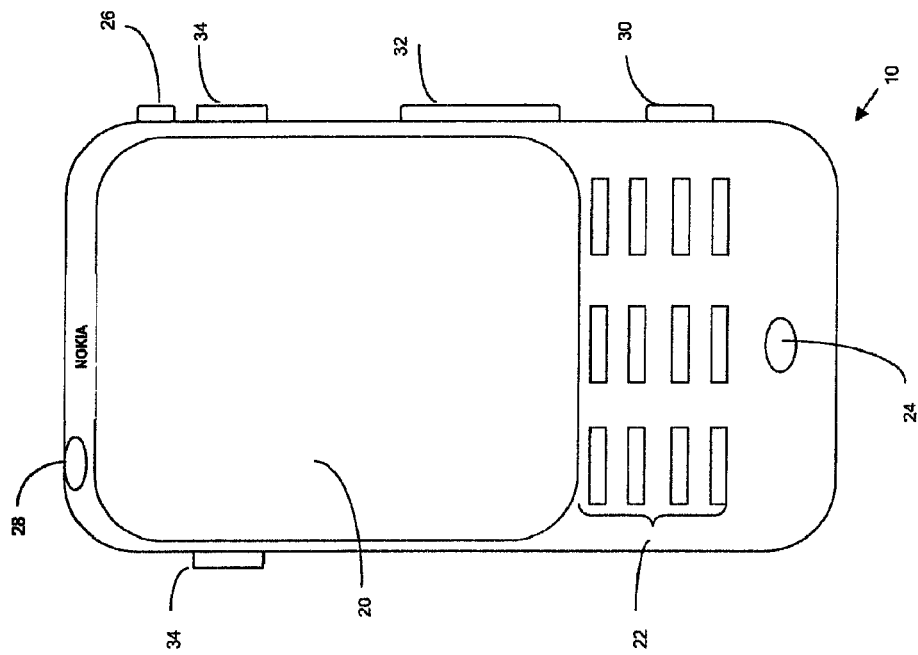

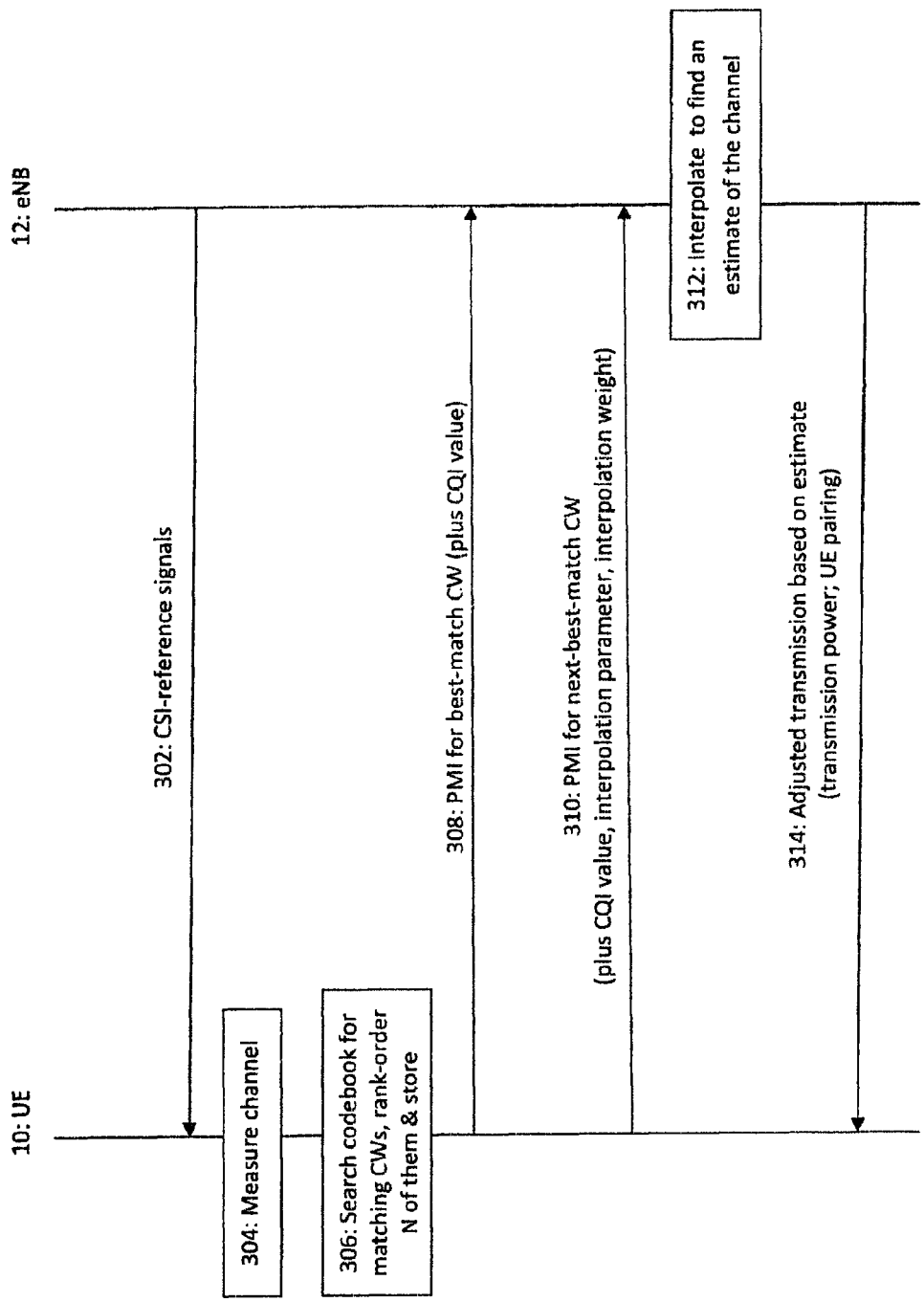

CHANNEL STATE INFORMATION FEEDBACK

RELATED APPLICATION

This application was originally filed as PCT Application No. PCT/FI2010/050329 filed on Apr. 22, 2010 and claims priority to U.S. Provisional Application No. 61/214855 filed on Apr. 28, 2009, which is incorporated herein by reference in its entirety

TECHNICAL FIELD

The exemplary and non-limiting embodiments of this invention relate generally to wireless communication systems, methods, devices and computer programs and, more specifically, relate to reporting channel state/condition from one entity which wirelessly receives on the channel to another entity which wirelessly sends on the channel.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A communication system known as evolved UTRAN (EUTRAN, also referred to as UTRAN-LTE for Long Term Evolution or as E-UTRA, see below for acronym meanings) is currently under development within the third generation partnership project (3GPP). As presently specified the downlink (DL, network access node eNB toward user equipment UE) access technique will be orthogonal frequency division multiple access OFDMA, and the uplink (UL, UE toward eNB) access technique will be single carrier frequency division multiple access (SC-FDMA).

FIG. 1 reproduces FIG. 4.1 of 3GPP TS 36.300 V8.6.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8). FIG. 1 shows the overall architecture of the E-UTRAN system. The EUTRAN system includes eNBs, providing the EUTRA user plane (packet data convergence protocol PDCP/radio link control RLC/medium access control MAC/physical PHY layers) and control plane (radio resource control layer) protocol terminations towards the UE. The eNBs are interconnected with each other by means of an X2 interface. The eNBs are also connected by means of an S1 interface to an evolved packet core EPC, more specifically to a mobility management entity (MME) by means of a S1 MME interface and to a serving gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or O&M); and
a measurement and measurement reporting configuration for mobility and scheduling.

Of particular interest to certain embodiments of the invention detailed below are the further releases of 3GPP LTE targeted towards future International Mobile Telecommunications IMT-A systems, referred to herein for convenience simply as LTE-A (LTE-Advanced). 3GPP TR 36.913, and 3GPP TR 36.814 each pertain to LTE-A and describe it to be an extension over LTE, particularly LTE Release-9. Specifically, LTE-A seeks to improve performance of multi-user (MU) and collaborative (C-) multiple-input/multiple output (MIMO) in order to provide higher data-rates with a limited amount of spectrum, i.e. high spectral efficiency. LTE-A also envisions high-layer transmission (e.g., up to 8). In order to obtain gains from spatial multiplexing methods in LTE-A, it is necessary that the eNB have sufficient knowledge of the wireless channel state information (CSI) that is seen by the UE. In LTE Rel-8, the downlink channel state information is jointly quantized at the UE and fed back in uplink through the physical uplink control channel PUCCH and/or the physical uplink shared channel PUSCH. This is done by mapping the set of n bits of quantization points to a codebook of codewords. The index of a preferred codeword is reported by the UE to the eNB, where 'preferred' codeword indicates the codeword that the UE determines would maximize the received power (or otherwise optimize a pre-determined measure) from the eNB on the channel for which the UE just measured CSI if such codeword was applied by the eNB for spatial precoding to transmit to that particular UE.

In order to deliver considerable throughput gains, multi-user MIMO (also known as spatial division multiple access, SDMA) and cooperative MIMO techniques (also referred to as cooperative multipoint transmission, CoMP) require very accurate channel state information at the transmitter. Typically channel state information feedback is based on codebooks as noted above. In some instances the UE feeds back a codeword that represents a quantized version of the wireless channel, which typically the eNB uses the complex conjugate or Hermitian transpose of the reported codeword(s) as transmit precoding weights. In other instances the UE feeds back a codeword that is a precoder recommendation that represents already the preferred precoding weights to be applied at eNB for transmit precoding (i.e. no complex conjugate or Hermitian transpose operation at the eNB is needed).

Limited uplink feedback capacity and UE computational complexity constraints (since the UE has to evaluate the codebook entries in order to select the proper codeword) are the typical limitations leading to the current typical practice of small codebook sizes. For example, the LTE Rel-8 codebook has been designed to be a tradeoff between its size and performance for single-user SU-MIMO. However, what may be sufficient for SU-MIMO is not necessarily sufficient for multi-user MU-MIMO or cooperative MIMO. For example, while SU-MIMO codebook entries provide sufficient orthogonality to be used for multi-layer SU-MIMO transmission, this is not sufficient in the MU-MIMO mode because the degree of inter-user interference is much higher. One limiting factor is the size of the codebook itself.

It appears on the surface that a simple solution would be to increase the size of the codebook. However with increasing codebook size, the complexity of codeword selection at the UE grows, exponentially in fact. Moreover, the standardization of a large codebook would be an issue, and furthermore larger codebook size tends to increase the required signaling overhead.

Of the various prior art approaches of which the inventors are aware that seek to limit codebook size while providing accurate enough channel state information, most are seen to require some expansion of the codebook size and therefore added processing at the UE terminal as well as increased reporting overhead in the uplink direction. As noted above, larger codebooks also become increasingly difficult to standardize.

One specific prior art approach is detailed at Tdoc R1-091288; 3GPP TSG RAN WG1 Meeting #56bis (Seoul, Korea, 23-27 Mar. 2009) by Philips and entitled "CSI FEEDBACK IMPROVEMENTS FOR LTE-A BASED ON MULTIPLE CODEBOOKS", which its title makes clear proposes multiple codebooks: a coarse codebook of dimensions M and a refinement codebook of dimensions M−1, where there are M transmit antennas at the eNB. In short, that paper describes that the refinement codebook is a projection of the coarse codebook to an orthogonal space of a previously reported codeword taken from the coarse codebook. That paper does not resolve two issues. First, the increased complexity at the UE terminal, which after constructing the refinement codebook must search again for the best matching codeword. Second, it appears that the refinement codebook has to be computed on the fly (which is a computational burden) or pre-computed and stored in UE's memory (in which case the size of such pre-computed codebook would appear to be only slightly less than the size of the original coarse codebook).

Another specific prior art approach is proposed in 3GPP, and refers to the so called hierarchical codebook. In this approach a large amount of standardized codewords are sorted to subgroups based on their closeness to each other. In this way, the codebook has a layered structure. While the layering may simplify the UE's search for the best codeword, still there is a very large codebook which has to be standardized.

SUMMARY

In a first aspect thereof the exemplary embodiments of the invention provide a method comprising: measuring a state of a wireless channel on which information is received; using the measured state to select from a codebook a plurality of N codewords which optimize a predefined measure, wherein N is an integer greater than one; reporting a first codeword of the N codewords which best optimizes the predefined measure; and reporting a second codeword of the N codewords that next-best optimizes the predefined measure after the first codeword.

In a second aspect thereof the exemplary embodiments of the invention provide a memory storing a computer program that is executable by a processor to perform actions comprising: measuring a state of a wireless channel on which information is received; using the measured state to select from a codebook a plurality of N codewords which optimize a predefined measure, wherein N is an integer greater than one; reporting a first codeword of the N codewords which best optimizes the predefined measure; and reporting a second codeword of the N codewords that next-best optimizes the predefined measure after the first codeword.

In a third aspect thereof the exemplary embodiments of the invention provide an apparatus comprising at least one processor and at least one memory including computer program code and a codebook. In this aspect the at least one memory and the computer program code are configured, with the at least one processor, to cause the apparatus at least to perform: measuring a state of a wireless channel on which information is received; using the measured state to select from the codebook a plurality of N codewords which optimize a predefined measure, wherein N is an integer greater than one; reporting a first codeword of the N codewords which best optimizes the predefined measure; and reporting a second codeword of the N codewords that next-best optimizes the predefined measure after the first codeword.

In a fourth aspect thereof the exemplary embodiments of the invention provide a method comprising: receiving from a user equipment a first indication of a first codeword and a second indication of a second codeword; searching a codebook using the first indication and the second indication to find the first codeword and the second codeword; and utilizing the first codeword and the second codeword to improve channel state information.

In a fifth aspect thereof the exemplary embodiments of the invention provide a memory storing a computer program that is executable by a processor to perform actions comprising: receiving from a user equipment a first indication of a first codeword and a second indication of a second codeword; searching a codebook using the first indication and the second indication to find the first codeword and the second codeword; and using the first codeword and the second codeword to improve channel state information.

In a sixth aspect thereof the exemplary embodiments of the invention provide an apparatus comprising at least one processor and at least one memory including computer program code and a codebook. In this aspect the at least one memory and the computer program code are configured, with the at least one processor, to cause the apparatus at least to perform: receiving from the user equipment a first indication of a first codeword and a second indication of a second codeword; searching the codebook using the first indication and the second indication to find the first codeword and the second codeword; and utilizing the first codeword and the second codeword to improve channel state information.

BRIEF DESCRIPTION OF THE DRAWINGS

FIG. 1 reproduces FIG. 4 of 3GPP TS 36.300, and shows the overall architecture of the E-UTRAN system.

FIG. 2B shows a more particularized block diagram of a user equipment such as that shown at FIG. 2A.

FIG. 3 is a signaling diagram giving an overview of operation and interaction between the UE and the eNB according to an exemplary embodiment of the invention.

FIGS. 6A-B are logic flow diagrams that illustrates the operation of a method, and a result of execution of computer program instructions embodied on a computer readable memory, in accordance with the exemplary embodiments of

DETAILED DESCRIPTION

Note that while LTE and LTE-A are used as specific systems in which embodiments of the invention detailed below can be used to advantage, these teachings are not limited to those specific systems and can be used to advantage in any closed loop MIMO system where the UE reports its measured channel state/quality to the eNB (or vice versa for the case where the UL channel is the one being measured).

Exemplary embodiments of this invention present a new method for improving the accuracy of channel state information at the transmitter side without extra uplink feedback or increased codebook size at the receiver side. Additionally, there is minimal difficulty in implementation due to standardization difficulties as is apparent with the prior art approaches noted in background above, because these techniques do not depend on some new codebook or a new codebook structure/layering. In brief, exemplary embodiments of the invention have the UE search its codebook for a plurality of N codewords which best-match the measured channel (where N is an integer greater than one), the UE rank-orders these N best matches, and sends to the eNB the codebook index for the best-match codeword and the index for the next-best-match codeword etc., for at least two and as many as all of the N best match codewords. The eNB then recovers the codewords from the reported indices and in an embodiment improves the CSI by interpolating between them to find an interpolated precoding matrix (which typically would not itself belong to the codebook used for the reporting, though this in itself is not impossible) that matches the channel seen by the UE better than any of those reported codewords individually. Stated more generally, the UE searches its codebook, using the channel state it measures, and selects those N codewords from the codebook which best optimizes a predetermined performance measure. Other exemplary performance measures are detailed below, and optimizing may be either maximizing or minimizing a distance from the codeword to some performance value, depending on what is the measure or criteria to be maximized/optimized. For example, throughput or signal to noise ratio would be maximized in order to maximize performance whereas chordal distance would be minimized in order to maximize the performance.

Below are detailed variations for different implementations and different embodiments, but the above summarized approach requires but a single codebook search by the UE and the codebook need not be expanded beyond what are currently in use for LTE (though new codebooks can be adopted). Also, the above-summarized approach provides the eNB with sufficient information to get a more accurate and more precise estimate of the channel which the UE actually sees than any of the N codewords would provide individually, with an increase in signaling overhead that is either nil or only slight as compared to prior art approaches.

Figure 2A:
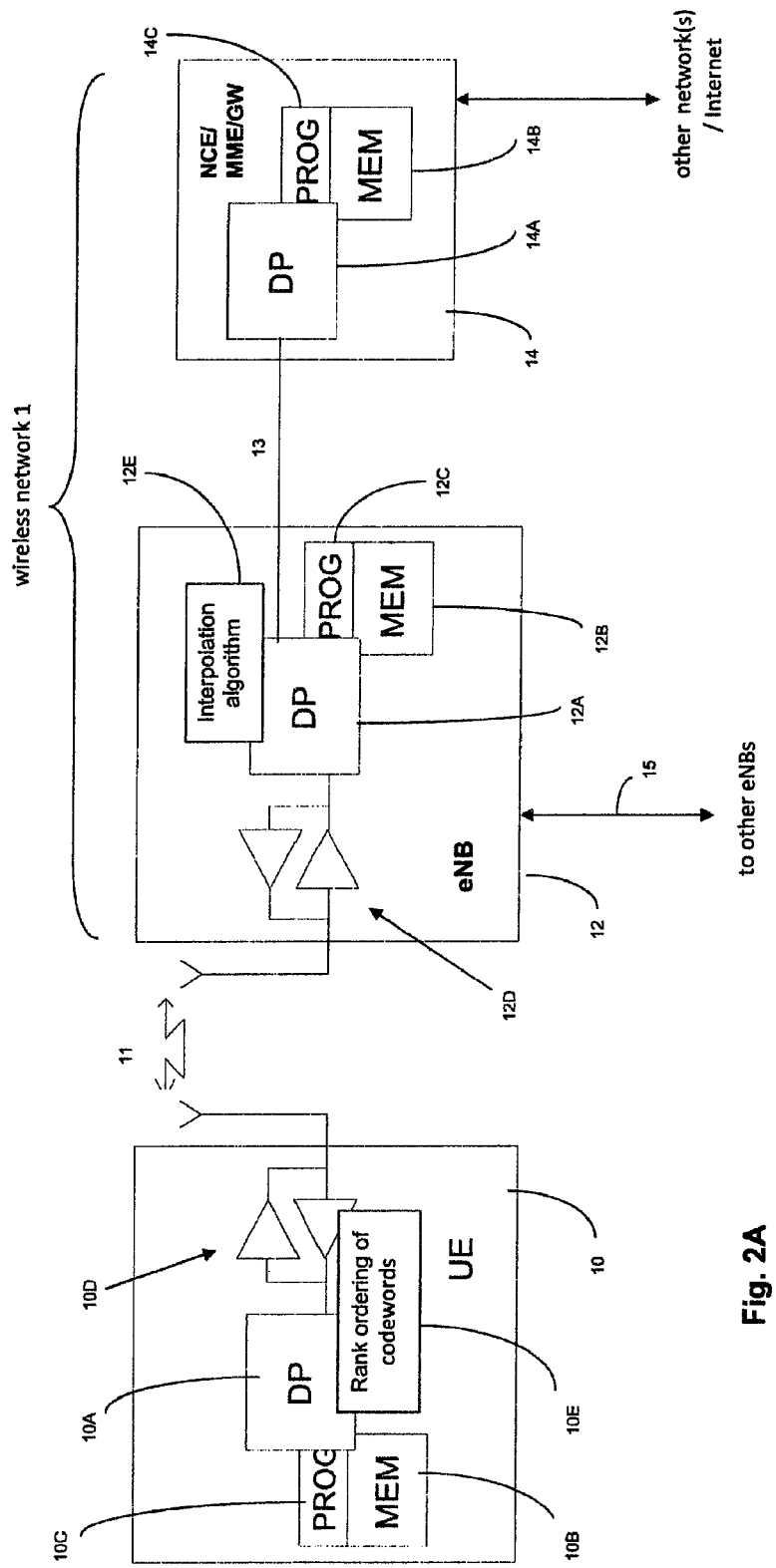
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1, and which provides connectivity with a network 1, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas (shown more particularly at FIG. 2B). The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas 12F (more than one antenna for MIMO operations). The eNB 12 is coupled via a data/control path 13 to the NCE 14. The path 13 may be implemented as the Si interface shown in FIG. 1. The eNB 12 may also be coupled to another eNB via data/control path 15, which may be implemented as the X2 interface shown in FIG. 1.

While only one UE 10 is shown at FIG. 2A, it is understood that the eNB may assign multiple UEs to the MU-MIMO or C-MIMO channel for which advantages of these teachings are particularly pronounced. Each UE operates according to these teachings similarly and the eNB operates similarly for each individual UE, the exception being when the eNB adjusts UE pairing on the MU-MIMO channel based on the feedback on that channel that it receives according to these teachings.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a rank ordering of codewords 10E which are stored in its memory, and the eNB 12 may include an interpolation algorithm 12E. Each of these may be physically within other components of the host device 10, 12, but are shown as distinct functional blocks at FIG. 2A for clarity of explanation.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 2B illustrates further detail of an exemplary UE in both plan view (left) and sectional view (right), and the invention may be embodied in one or some combination of those more function-specific components. At FIG. 2B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention are most relevant to the baseband chip 42 where a plurality of N codewords are selected from the codebook in the memory using the UE's measured state of the channel to best maximize some performance criteria or measure, though it is noted that other embodiments need not be disposed there but may be disposed across various chips and memories as shown or disposed within another processor that combines some of the functions described above for FIG. 2B. Note that there are several ways by which the UE can select those N best-maximizing codewords; those with smallest distance (best match) to the measured channel state, those which maximize mutual information or minimize chordal distance or maximize received signal-to-noise ratio SNR or maximize expected throughput, to name a few non-limiting examples. This matching may be stated generally as selecting the N codewords to maximize a predefined optimization measure. Any or all of these various processors of FIG. 2B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 2B.

Note that the various chips (e.g., 38, 40, 42, etc.) that were described above may be combined into a fewer number than described and, in a most compact case, may all be embodied physically within a single chip.

The eNB 12 may also have similar physical divisions of functions generally similar to those shown at FIG. 2B for the UE, but for the eNB its multiple antennas 12F are typically tower-mounted as an array.

In typical prior art arrangements the UE reports to the eNB the codeword from the codebook that provides the best match with the downlink channel state information (or some function of the channel such as the right singular space of the channel matrix). Whether the actual bit-string in the report is an index to the codebook or a bit-string that is the right singular space, in whatever form this represents reporting the codeword. Note that at the reporting time, the UE has searched the codebook for the best codeword. Since it settled on which codeword was best, it follows that the UE has knowledge of several codewords that were not as good of a match to the state information that the UE measured for the downlink channel. In other words, the UE either knows, or can know with little extra processing effort (and clearly without performing another search of the codebook), the best-match codeword, second best codeword, and so on.

The above is an important feature of exemplary embodiments of the invention. While conducting its search of the codebook, the UE stores a set of N codewords which it selects according to a predefined optimization measure for the downlink channel of interest, e.g., those which best match the state of the downlink channel which the UE measured. This is but one way to optimize a predefined performance measure. The number N is an integer at least equal to two. The UE selects that set of N codewords using the measured channel state of the downlink channel it is reporting to the eNB. The UE could store the N selected codewords themselves, copied from the codebook, or more simply it stores indications for them such as their codebook indices in its local memory. In either case in an embodiment the UE stores them with rank-order information which represents the 'goodness' of the match of the codewords (or their indications) to the measured state of the channel. More generally, the rank order is how well the ranked codewords maximize the performance measure, e.g., how close they are to the measured channel state. Thus for N=4 codewords, there will be a codeword that is ranked as the best match/most-maximizing, another that is ranked as the next best match/next-most-maximizing, still another that is ranked as the third best match/third-most-maximizing, and the final of the N codewords will be ranked as the fourth best match which is the worst match or least maximizing among the selected set of N codewords. Still that fourth-best match is a better match to the measured channel state than any of the other codewords in the codebook that were not among the rank-ordered N best matches.

Having more these N most-maximizing (best-matching) codewords, then the UE can report (at least) the most-maximizing codeword and a second-most-maximizing codeword to the eNB. The eNB can then interpolate between them and that interpolation is closer to the predefined optimization measure (e.g., a better estimate of the channel as represented by the channel state that the UE measured) than either the first or second codeword would be individually. Since in some instances the eNB might benefit from interpolating among more than two codewords, N can be greater than two and the UE can report more than two best-maximizing codewords, but the specific examples presented herein only two codewords are considered for simplicity of explanation. The concept can be generalized to the report of $3^{rd}$, $4^{th}$, ..., N-th best codeword. With the knowledge of N-th best codeword, the eNB may compute codeword that even better maximizes the current optimization measure (e.g., the measured channel state such as the right singular space, which is the UE's actual measured state of the channel; relative optimization is reflected in the distance from the codeword to the measured channel state).

Note that to enable this interpolation, there is no need for the UE to perform two codebook searches (either of a single codebook or separate searches of the coarse and refinement codebooks noted in the background section above). Additionally, there is no need to increase the size of the UE's codebook search space; interpolation between the two (or more) best match codewords enables the eNB to find a channel state (e.g., right singular space) that is closer than any codeword in the codebook to the actual space measured by the UE for the channel, without adding any more codewords to the codebook itself.

FIG. 3 is a signaling diagram that gives a general overview of an exemplary process. At 302 the eNB 12 sends a reference signal to the UE 10. The reference signal is just one implementation of information the UE can use to measure the state of the channel over which that information/reference signal is sent; the UE can alternatively measure data on that channel. As a specific non-limiting example, in LTE-A there is a new CSI-reference signal (CSI-RS) which is to be defined to support the channel estimation operation for channel state information feedback purposes, i.e. the UE estimates the channel to antenna ports of its own cell (or multiple cells in case of C-MIMO) using the CSI-RSs that are transmitted at certain time intervals (e.g. in periodically occurring sub-frames).

At block 304 the UE measures the channel and performs channel estimation. At 306 the UE searches the codebook (which is stored in its local memory) for matching codewords CWs, and stores in rank-order the N best-matching codewords (or which otherwise best-maximize a performance measure). The UE 10 searches through each codeword in the specified codebook and ranks them according to a predefined optimization measure. As above, exemplary and non-limiting performance measures/optimization criteria are throughput, chordal distance, measured channel state, mutual information, and SNR. The best matching codeword is the codeword that maximizes/minimizes distance to the optimization measure. With the same process, the UE also obviously finds the second best maximizing codeword to be reported, i.e. finding the second best maximizing codeword does not imply any extra complexity to the UE. Similarly, the third, fourth, ..., N-th best maximizing codeword information is also readily available to the UE.

At 308 the UE 10 sends to the eNB 12 the precoding matrix index PMI (or some other indication or index into the codebook) of the best-maximizing codeword from the search at 306. Consider this best-maximizing codeword at block 308 as a first codeword. For specific implementation in LTE-A, the uplink channel used for the reporting at 308 and 310 would be in an embodiment either the physical uplink control channel PUCCH or the physical uplink shared channel PUSCH (either periodic or aperiodic reports on the PUSCH).

At 310 the UE 10 sends to the eNB 12 the PMI (or some other indication) of the next-best-maximizing codeword from the single search which was done at 306. Consider this next-best-maximizing codeword at block 310 as a second codeword.

In an embodiment, the UE 10 embeds one or multiple channel quality indicator CQI values to each uplink report (or to the single report if both are sent together as noted below) corresponding to one or multiple code words. The eNB 12 can use the CQI values as weights in the interpolation when calculating an ideal precoding vector based on the first/best and second/next-best codewords. This is detailed below, as well as other embodiments in which the UE 10 sends some other interpolation parameter and/or interpolation weight with the first and/or second codewords to aid in the eNB's interpolation.

Specifically, in an embodiment while searching for the best and second best codewords at 306, the UE 10 also finds out the corresponding channel quality indicators. Depending on the feed-back mode, the UE 10 includes into a single uplink report 308, 310 one or more CQIs and PMIs (or other indication or index referring to the first/best or the second/next-best codeword). In this manner, each individual report 308, 310 containing the PMI corresponding to the first/best or the second/next-best codewords is similar to a regular aperiodic report, and can be used as such by the eNB 12. This is also very useful in case the eNB fails to receive one of the reports.

The PMIs (or other indices/indicators) for the first and second codewords can be sent in different uplink report messages as FIG. 3 implies. This can be generalized to reporting the first codeword at a first reporting time instant, and reporting the second codeword at a second reporting time instant. Alternatively, the first and second codewords can be sent together in a single uplink report (e.g., at the same reporting time instant) if the uplink capacity allows for this larger report size. In either of these two embodiments, the UE can also include in the uplink report(s) at least one bit that distinguishes which of the first and second codewords is the most maximizing of the performance measure from which of the first and second codewords is the next-most-maximizing of the performance measure. In an embodiment there is a rank-order bit (or bits) reported with each codeword which tells if it is ranked higher or lower (more or less maximizing of the performance measure) than another codeword being reported. Such a rank-order bit may not be necessary if instead there is a predetermined arrangement to the uplink report(s) in which both UE and eNB understand that the order in which the different codewords are reported represents their rank relative to one another as to best or next-best maximization of the performance measure. The order may be chronological for the case of different uplink reports or it may be serial position within the uplink report for the case of both codewords being sent in a single report.

The eNB 12 will receive both reported codewords and can decide to interpolate between them in order to better match the transmit precoder to the actual channel. It is noted that the 1$^{st}$ best codeword is also useful as a self-contained codeword, i.e. it can be always used as such, but is just not as accurate as when it is used together with the second codeword (and third and fourth codewords, however many may be reported). These other reported codewords which are not the best-match codeword of the set of N codewords may be considered refinement codewords.

Whether the two (or more) codewords are sent together or separate, the eNB 12 receives both the first and second codewords and at 312 interpolates between them to find an estimate of the channel on which the reference signal was sent at 302. A specific implementation for this interpolation is detailed below. The eNB 12 then adjusts its next transmission at 314 to the UE 10 based on the estimate achieved at 312 for the channel. This adjustment may be manifest, for example, as a change to transmission power or as a change to MU-MIMO UE's which the eNB 12 pairs (i.e. multiplexes spatially) on the channel resources. As noted above, the interpolating at 312 can be considered more generally as utilizing the two codewords to improve channel state information.

Figure 4A:
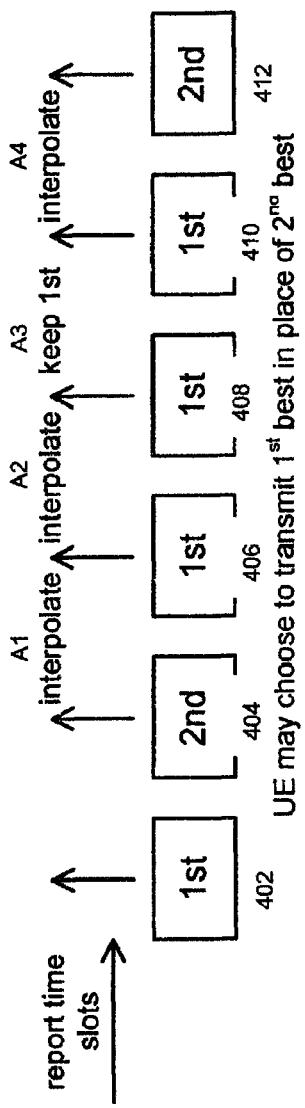
FIG. 4A is a conceptual illustration of a first embodiment of the invention in which the UE sends indices for different codewords for interpolation by the eNB.

FIG. 4A illustrates schematically the first variation noted above in which the first/best codeword is sent in a first uplink report 308 and the second/next-best codeword is sent in a second uplink report 310 different from the first. Only one codeword is sent in one reporting time slot. At FIG. 4A there are reporting time slots 402, 404, 406, 408, 410 and 412, which are illustrated in chronological order left to right. In this first variation the reporting time slot ordering is defined such that the UE 10 reports first the PMI corresponding to the best-match codeword in every other slot (402, 406, 408 and 410 of FIG. 4A) and the second best-match codeword in every other slot (404, 408 and 412 of FIG. 4A). The eNB 12 interpolates among the two most recently-received codewords as shown: at A1 the eNB interpolates between the first/best-match codeword received at 402 and the second/next-best-match codeword which it received at 404; the interpolation at A2 is between codewords received at 404 and 406, and so forth for A3 and A4. The report at 402 may be considered a first uplink report and the report at 404 may be considered the second uplink report.

But as illustrated at slot 408 of FIG. 4A, the UE might still choose to report the first/best-match codeword in a slot which is defined for the second/next-best-match codeword. The UE can make this choice for several reasons. For example, the actual first/best-match codeword may be matching to the un-quantized channel better than the interpolation between the first/best-match and the second/next-best-match codewords would match. In this case, the eNB 12 would use the same codewords in the interpolation, hence ending up with the first/best-match codeword (i.e. keeping the same codeword). This is shown at A3 in which the two most recently received codewords at 406 and 408 are the same, so the eNB 12 can skip the interpolating since it would yield the same first/best-match codeword.

As another example of why the UE 10 might choose to not report the second/next-best codeword in a reporting period defined for that, it may be that the first/best-match codeword was changed from the previous time slot due to changes in the UE C SI. Hence the eNB 12 would use the previous best-match codeword and the current best-match codewords in the interpolation, hence ending up with a codeword that is between the previous and current first-best-matches.

Note that the report timeslots 402, 404, 406 etc. at FIG. 4A do not have to be arranged periodically. The report time slots could be as well arranged, e.g., so that the first and second codewords and their corresponding CQIs are reported in consecutive uplink subframes, while the time difference between reports bearing the second-best-match codeword and those bearing the next best-match codeword could be multiple subframes.

Figure 4B:
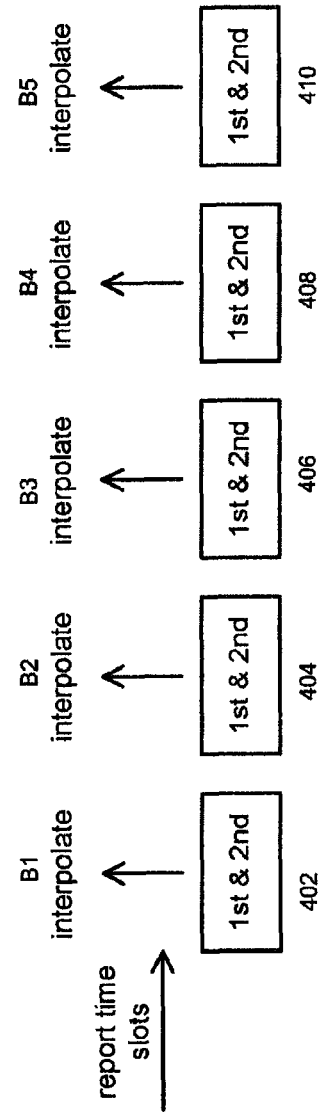
FIG. 4B is a conceptual illustration similar to FIG. 4A, but of a second embodiment in which two indices are sent in the same uplink report.

FIG. 4B illustrates schematically the second variation noted above in which the two different-rank codewords are sent in a single uplink report. In each of reporting slots 402, 404, 406, 408 and 410 of FIG. 4B, the UE 10 sends both the first/best-match codeword and the second/next-best-match codeword. At each of B1 through B5, the eNB 12 interpolates between those two codewords it receives. One drawback to this approach is that there it requires higher signaling overhead to report both these codewords in each slot. For the case where, as above, the UE sees that the first/best-match codeword is a closer match than an interpolation between it and the second/next-best-match codeword would be, the UE may choose to include only the first/best-match codeword in a report according to this second variation, either alone or copied if the report format requires two instances of the PMI to be read properly at the eNB 12.

Once the eNB 12 has knowledge of both the first/best-match codeword and the second/next-best-match codeword, it may interpolate between the two. One non-limiting example as to how the eNB 12 may interpolate between two generic codewords W$_1$ and W$_2$ is to use a geodesic Γ(p), which is defined in a non-limiting example as $$\Gamma(p) = W_1 V \cos(\Phi p) + U \sin(\Phi p), \qquad [1]$$

where the Singular Value Decomposition (SVD)

$$U \tan(\Phi) V^H = W_2 (W_1^H W_2)^{-1} - W_1 \qquad [2]$$

defines the missing constants of the geodesic.

With the knowledge of up to N-th best codeword, interpolation between codeword pairs could be performed e.g. by N–1 consecutive geodesics. The parameter p could be the interpolation parameter noted above that is sent in the uplink report 308, 310 (one of them if the first variation above is used), or it could be estimated at the eNB (for example, from the difference of CQIs reported for any pair of codewords that are ranked adjacent to one another). Where the UE reports the interpolation parameter p, in an embodiment the UE computes an optimum value for it, which is the value that the UE sends in the uplink report.

From the above it is clear that certain embodiments of the invention provide the technical effect that only one coarse codebook needs to be standardized as done for LTE Rel-8, i.e. no additional refinement codebook needs to be standardized. In other words, the standardized codebook itself serves also as refinement codebook. Another technical effect of certain embodiments is that precoding performance is improved with minimum extra specification or implementation effort. Another technical effect of certain embodiments is that no extra complexity is implied to the UE 10, because while looking for the first/best-match codeword the UE also finds the second/next-best codeword, and more generally up to the N-th best codeword in which all of the codewords in that N-sized set are ranked by the UE 10 in increasing or decreasing order of a given performance measure. Another technical effect of certain embodiments according to the first variation noted above with respect to FIG. 4A is that the amount of overhead does not change between the reports informing of the first/best-match codeword and those informing of the second/next-best-match codewords. And additionally, still another technical effect of certain embodiments according to the first variation is that for the case where reception of one of the reports fails, the eNB can still schedule data to the UE based on the other report, as long as both reports include one or more CQI values.

One issue that might be addressed at the implementation stage is that the interpolated codeword is not necessarily a constant modulus (CM) codeword and thus a CM property would need to be forced at the eNB, and so in practice this might decrease somewhat the performance gain otherwise achievable. Forcing CM is needed only for the case where the eNB transmit power is otherwise fully utilized (i.e. no power headroom in the power amplifier). In general, improved knowledge of the wireless channel is always beneficial for user pairing (i.e. spatial multiplexing) in context of MU- and C-MIMO.

Figure 5A:
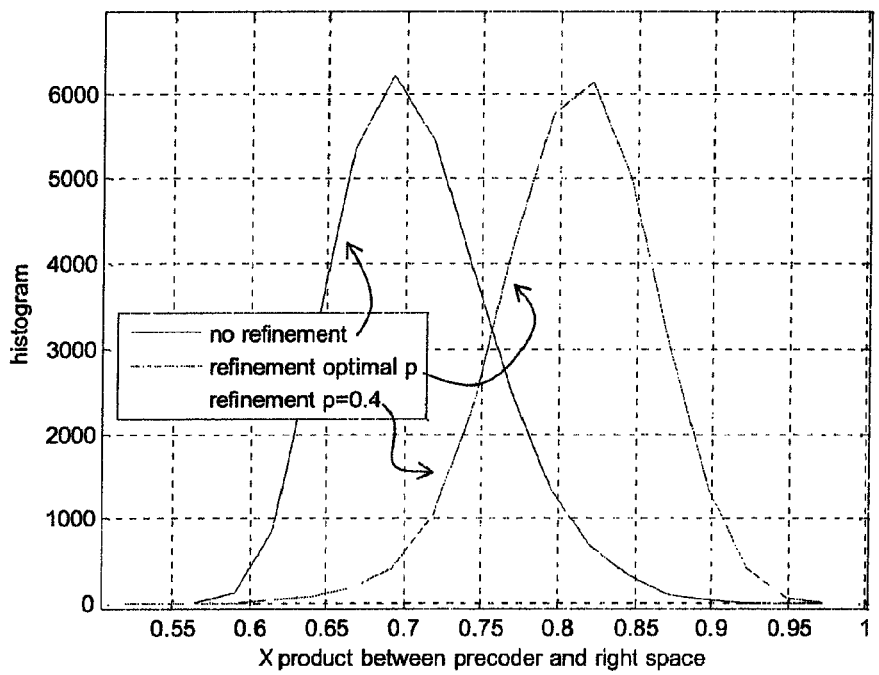
FIG. 5A is a graph showing cross-product after precoding with a single codeword and with interpolation between two codewords, quantifying advantages of the exemplary embodiment.
Figure 5B:
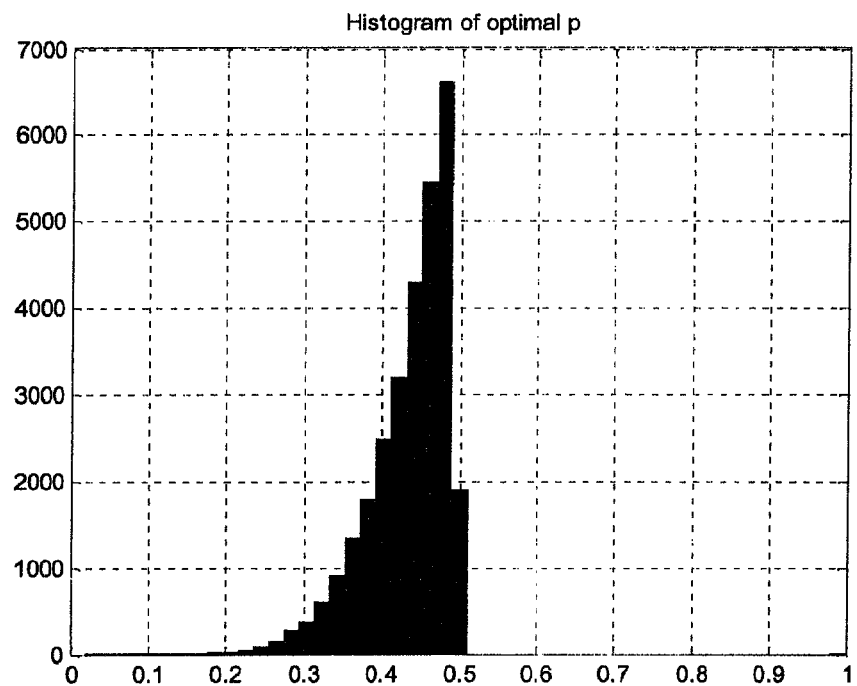
FIG. 5B is a histogram illustrating comparative benefits for values of the interpolation parameter p.

FIGS. 5A-B quantify the performance improvement which embodiments of this invention yield over the prior art. One way to measure such improvement is by observing the distribution of channel cross-product (X product defined as $X=|VW|$, where $U\Lambda V^H=H$ is the SVD of channel) after precoding for coarse (single best-match codeword only) and refined (both best-match and next-best-match codewords) codebook, which is plotted at FIG. 5A. The refined codebook at the legend assumes that the index of second best codeword is available with first best codeword. The gain between modes of both distributions is 1.4 dB for 8 transmit antennas and a 6-bit coarse codebook and an interpolation parameter fixed at p=0.4. This interpolation parameter was used by the inventors, but FIG. 5B shows the histogram/distribution of the optimal interpolation parameter p.

Figure 6A:
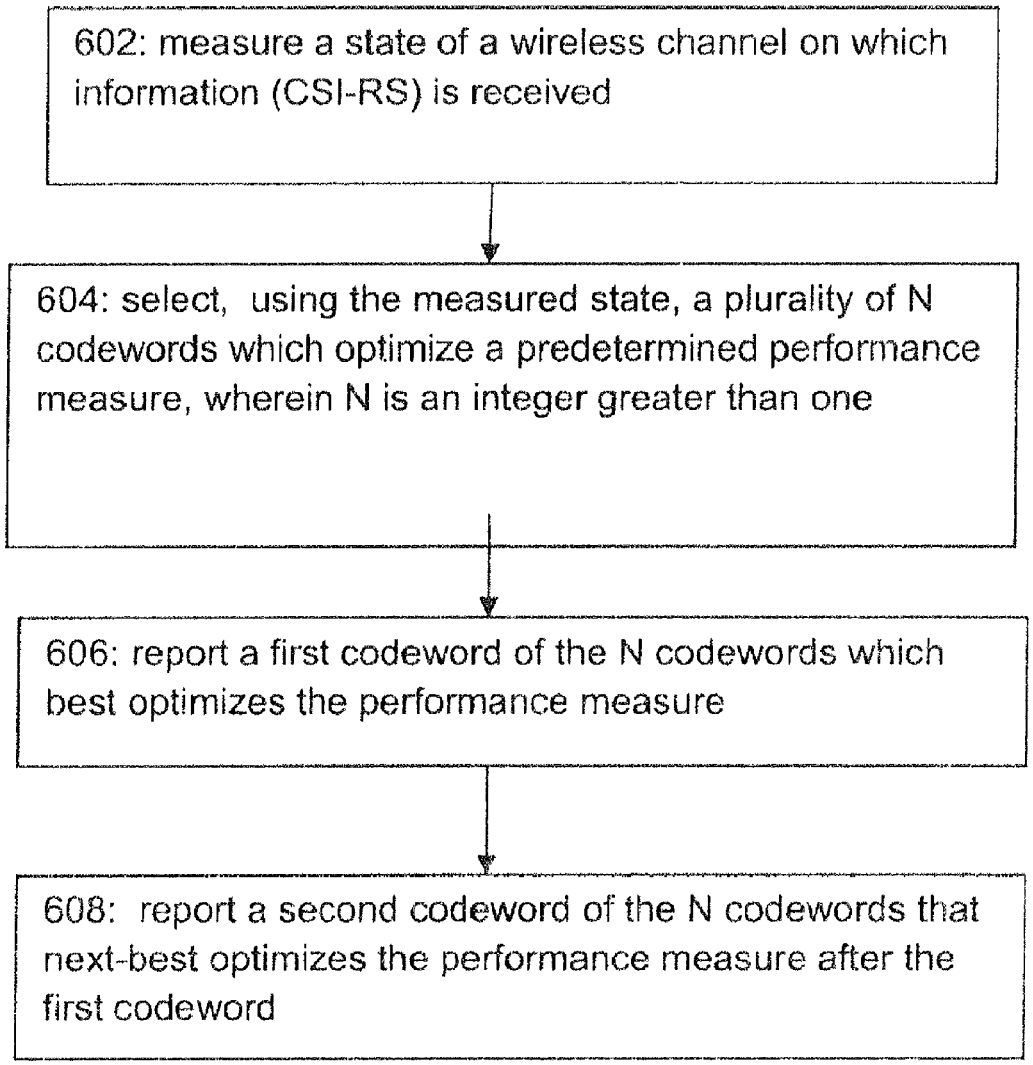

Based on the foregoing and with reference to FIG. 6A it should be apparent that the exemplary embodiments of this invention from the perspective of the UE 10 provide a method, apparatus and a memory storing a computer program(s) that is executable by a processor to perform actions to measure at block 602 a state of a wireless channel on which information is received; to select at block 604 (e.g., using a processor and a single search of a codebook stored in a memory of the UE) using the measured state, a plurality of N codewords which maximize or otherwise optimize a predefined measure, wherein N is an integer greater than one, to report at block 606 a first codeword of the N codewords which best optimizes the predefined measure (e.g., that which best matches the measured state), and to report at block 608 a second codeword of the N codewords that next-best optimizes the predefined measure after the first codeword.

In a particular embodiment of FIG. 6A, reporting the first codeword of block 606 and reporting the second codeword of block 608 comprises transmitting in one uplink report an indication (e.g., PMI, index, etc.) of the first codeword and an indication of the second codeword, such as detailed with respect to FIG. 4B. Alternatively, reporting the first codeword comprises transmitting an indication of the first codeword in a first uplink report and reporting the second codeword comprises transmitting an indication of the second codeword in a second uplink report different from the first uplink report, as detailed with respect to FIG. 4A.

In another particular embodiment of FIG. 6A with or without the above particular embodiment, the uplink report comprises at least one bit which distinguishes which of the first and second codewords is the best match from which of the first and second codewords is the next-best match. This at least one bit may be used for the case as in FIG. 4B where there is only one uplink report that carries both first and second indications of the codewords, and/or it may be used for the case as in FIG. 4A where there first and second uplink reports carry the respective first and second indications of the codewords.

In another particular embodiment of FIG. 6A with or without any combination of the above particular embodiments, there is also reported at least one parameter which describes a best interpolation between the first codeword and the second codeword, wherein the best interpolation represents a better optimization of the predefined measure than both the first codeword and the second codeword. This parameter may be one or more interpolation weights corresponding to the first or second codewords for weighting an interpolation between them, in which the interpolation represents a higher maximization of the predefined optimization measure than both the first codeword and the second codeword. In a specific embodiment, each of the at least one interpolation weights comprises a value for channel quality information CQI. For example, the CQI can take the form of a recommended modulation and coding scheme MCS or an index into a table (predefined and stored in the local memory of both the UE and the eNB) of an MCS.

In another particular embodiment of FIG. 6A with or without any combination of the above particular embodiments, the method is executed by a user equipment, and: the channel comprises a wireless multiple-input/multiple-output MIMO channel; measuring the state of a wireless channel comprises receiving a reference signal at a receiver of the user equipment and estimating the wireless channel to each of at least two antenna ports of one or more cells; and wherein after searching the codebook the processor of the UE stores indications of the plurality of N codewords in a memory of the UE with rank-order information representing relative optimization of the predefined measure (e.g., relative goodness of the match of the codewords associated with the indications to the measured state).

Figure 6B:
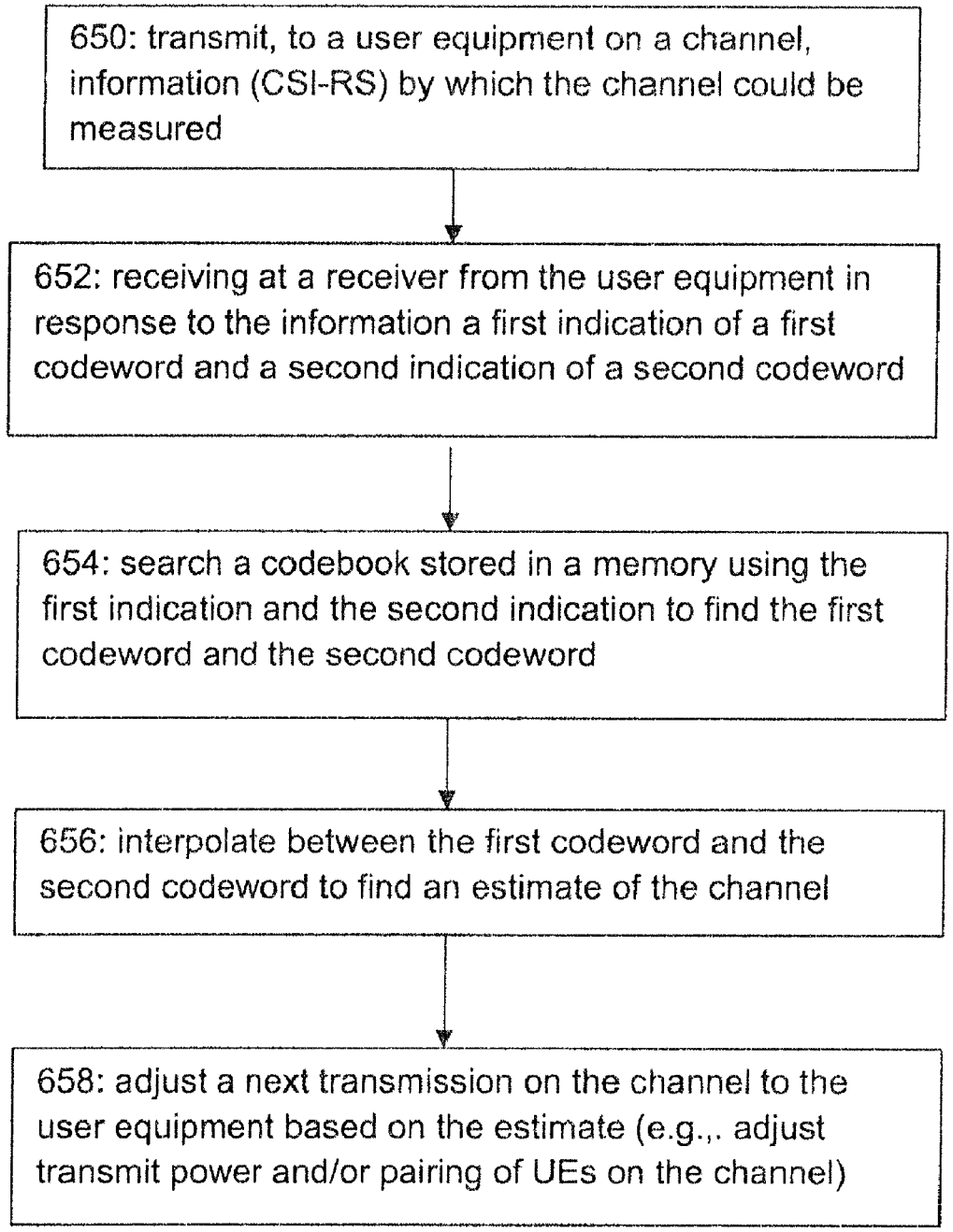

Based on the foregoing and with reference to FIG. 6B it should be apparent that the exemplary embodiments of this invention from the perspective of the eNB 12 provide a method, apparatus and a memory storing a computer program(s) that is executable by a processor to performs actions to transmit at block 650 (e.g., from a transmitter), to a user equipment on a channel, information by which the channel could be measured; to receive at block 652 (e.g., at a receiver) from the user equipment a first indication of a first codeword and a second indication of a second codeword; to search at block 654 (e.g., using a processor) a codebook stored in a memory using the first indication and the second indication to find the first codeword and the second codeword; and to interpolate at block 656 (also using the processor) between the first codeword and the second codeword to find an estimate of the channel. As noted above, the interpolating at 656 can be considered more generally as utilizing the two codewords to improve channel state information.

As a tangible result, the eNB 12 then adjusts at block 658 a next transmission on the channel to the user equipment based on the estimate. For example, this may be manifest by the eNB adjusting transmit power and/or adjusting pairing of user equipments on the channel.

In a particular embodiment of FIG. 6B, the first indication and the second indication are received in one uplink report as shown at FIG. 4B, and further at least one bit received in the uplink report is used (by the processor) to distinguish which of the first indication and the second indication are for a codeword which best maximizes/optimizes a predetermined performance measure. Alternatively, the first indication is received in a first uplink report and the second indication is received in a second uplink report different from the first uplink report, as is shown at FIG. 4A. In this FIG. 4A variation there may also be at least one bit, in either one or in both of the uplink reports, to distinguish which of the first indication and the second indication are for the codeword which best-maximizes the performance measure.

In another particular embodiment of FIG. 6B with or without any combination of the above particular embodiments, interpolating comprises using at least one parameter received from the user equipment which describes a best interpolation between the first codeword and the second codeword, wherein the best interpolation represents a better optimization of a predefined measure (e.g., a better match to a state of the channel measured by the user equipment) than both the first codeword and the second codeword. The parameter may be an interpolation weight, corresponding to and received with the first or second codewords, for weighting an interpolation between them, and in a more particular embodiment the interpolation weights comprises values for channel quality information CQI.

In another particular embodiment of FIG. 6B with or without any combination of the above particular embodiments, the method is executed by an access node of a wireless communication system, wherein: the channel comprises a wireless multiple-input/multiple-output MIMO channel; the information comprises a reference signal; and interpolating comprises using a geodesic algorithm stored in a local memory of the access node in which singular value decompositions define missing constants of the geodesic algorithm.

The various blocks shown in FIGS. 6A-B may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-A system, it should be appreciated that the exemplary embodiments of this invention are not limited for use with only this one particular type of wireless communication system, and that they may be used to advantage in other wireless communication systems such as for example EUTRAN or any other system that uses a closed loop feedback MIMO arrangement.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and bits are not intended to be limiting in any respect, as these parameters may be identified by any suitable names. Further, the formulas and expressions that use these various parameters may differ from those expressly disclosed herein. Further, the various names assigned to different channels (e.g., PUCCH, PUSCH etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:
1. A method comprising:
measuring a state of a wireless channel on which information is received;
using the measured state to select from a codebook a plurality of N codewords which optimize a predefined measure, wherein N is an integer greater than one;
reporting a first codeword of the N codewords which best optimizes the predefined measure; and
reporting a second codeword of the N codewords that next-best optimizes the predefined measure after the first codeword,
wherein a best interpolation between the first codeword and the second codeword represents a better optimization of the predefined measure than both the first codeword and the second codeword.

2. The method according to claim 1, in which reporting the first codeword and reporting the second codeword comprises one of transmitting in an uplink report an indication of the first codeword and an indication of the second codeword, and transmitting an indication of the first codeword in a first uplink report and transmitting an indication of the second codeword in a second uplink report different from the first uplink report.

3. The method according to claim 2, further comprising including in the report with at least one of the first and second codewords at least one bit that distinguishes the codeword which best optimizes from the codeword which next best optimizes.

4. The method according to claim 1, further comprising reporting at least one parameter which describes the best interpolation between the first codeword and the second codeword.

5. The method according to claim 4, in which each of the at least one parameter comprises a value for channel quality information or an index for a modulation and coding scheme.

6. The method according to claim 1, the method further comprising storing in a memory indications of the selected plurality of N codewords with associated rank-order information representing relative optimization of the predefined measure;
in which:
the method is executed by a user equipment;
the channel comprises a wireless multiple-input/multiple-output MIMO channel; and
measuring the state of the wireless channel comprises receiving a reference signal at a receiver of the user equipment and estimating the wireless channel to each of at least two antenna ports of one or more cells.

7. An apparatus comprising:
at least one processor; and
at least one memory including computer program code and a codebook;
the at least one memory and the computer program code configured, with the at least one processor, to cause the apparatus at least to perform:
measuring a state of a wireless channel on which information is received;
using the measured state to select from a codebook a plurality of N codewords which optimize a predefined measure, wherein N is an integer greater than one;
reporting a first codeword of the N codewords which best optimizes the predefined measure; and
reporting a second codeword of the N codewords that next-best optimizes the predefined measure after the first codeword, wherein a best interpolation between the first codeword and the second codeword represents a better optimization of the predefined measure than both the first codeword and the second codeword.

8. The apparatus according to claim 7, in which the first codeword which best optimizes the predefined measure is the codeword which best matches the measured state.

9. The apparatus according to claim 7, in which reporting the first codeword and reporting the second codeword comprises one of transmitting in an uplink report an indication of the first codeword and an indication of the second codeword, and transmitting an indication of the first codeword in a first uplink report and transmitting an indication of the second codeword in a second uplink report different from the first uplink report.

10. The apparatus according to claim 9, in which the at least one memory and the computer program code are configured, with the at least one processor, to cause the apparatus at least to further perform:
transmitting with at least one of the first and second codewords at least one bit that distinguishes the codeword which best optimizes from the codeword which next best optimizes.

11. The apparatus according to claim 7, in which the at least one memory and the computer program code are configured, with the at least one processor, to cause the apparatus at least to further perform:
reporting at least one parameter which describes the best interpolation between the first codeword and the second codeword.

12. The apparatus according to claim 11, in which each of the at least one parameter comprises a value for channel quality information or an index for a modulation and coding scheme.

13. The apparatus according to claim 7, in which the at least one memory and the computer program code are configured, with the at least one processor, to cause the apparatus at least to further perform:
storing in the at least one memory indications of the selected plurality of N codewords with associated rank-order information representing relative optimization of the predefined measure;
in which:
the apparatus comprises a user equipment;
the channel comprises a wireless multiple-input/multiple-output MIMO channel; and
measuring the state of the wireless channel comprises receiving a reference signal at a receiver of the user equipment and estimating the wireless channel to each of at least two antenna ports of one or more cells.

14. A method comprising:
receiving from a user equipment a first indication of a first codeword and a second indication of a second codeword;
searching a codebook using the first indication and the second indication to find the first codeword and the second codeword; and
utilizing the first codeword and the second codeword to improve channel state information,
wherein the first codeword best optimizes a predefined measure and the second codeword next-best optimizes the predefined measure after the first codeword, and wherein a best interpolation between the first codeword and the second codeword represents a better optimization of the predefined measure than both the first codeword and the second codeword.

15. The method according to claim 14, in which utilizing the first codeword and the second codeword to improve the channel state information comprises interpolating between the first codeword and the second codeword to find an estimate of a channel and adjusting at least one of transmit power, transmit precoding matrix, and pairing of user equipments for a next transmission on the channel to the user equipment based on the estimate.

16. The method according to claim 14, in which the first indication and the second indication are received in a first uplink report, or the first indication is received in a first uplink report and the second indication is received in a second uplink report different from the first uplink report.

17. The method according to claim 16, in which at least one of the first uplink report and the second uplink report comprises at least one bit which is used in the method to distinguish which of the first indication and the second indication are for the first codeword which best optimizes the predefined measure.

18. The method according to claim 14, in which utilizing the first codeword and the second codeword to improve the channel state information comprises interpolating between the first codeword and the second codeword to find an estimate of a channel using at least one parameter received from the user equipment which describes the best interpolation between the first codeword and the second codeword.

19. The method according to claim 18, in which each of the at least one parameter comprises a value for channel quality information or an index for a modulation and coding scheme.

20. The method according to claim 14, in which:
the method is executed by an access node of a wireless communication system;
the channel comprises a wireless multiple-input/multiple-output MIMO channel between the access node and the user equipment; and
utilizing the first codeword and the second codeword to improve the channel state information comprises interpolating between the first codeword and the second codeword to find an estimate of a channel using a geodesic algorithm stored in a memory of the access node in which singular value decompositions define missing constants of the geodesic algorithm.

* * * * *